(12) United States Patent
Fenk et al.

(10) Patent No.: US 6,486,732 B2
(45) Date of Patent: Nov. 26, 2002

(54) MODULATOR-DEMODULATOR

(75) Inventors: Josef Fenk, Eching (DE); Volker Thomas, Gilching (DE); Wolfgang Thomann, Linz (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/078,127

(22) Filed: Feb. 19, 2002

(65) Prior Publication Data

US 2002/0140514 A1 Oct. 3, 2002

Related U.S. Application Data

(63) Continuation of application No. PCT/DE00/02790, filed on Aug. 17, 2000.

(30) Foreign Application Priority Data

Aug. 18, 1999 (DE) ......................................... 199 39 093

(51) Int. Cl.⁷ ............................................... H03D 3/00
(52) U.S. Cl. ......................... 329/304; 375/279; 455/86; 455/313
(58) Field of Search ................................. 329/304–310; 375/279–283, 308, 329–333; 455/84, 86, 87, 313, 314

(56) References Cited

U.S. PATENT DOCUMENTS 5,457,424 A * 10/1995 McGinn et al. ............. 329/306
5,894,592 A   4/1999  Brueske et al.

FOREIGN PATENT DOCUMENTS

EP  0 905 917 A2  3/1999
GB  2 310 342 A   8/1997

* cited by examiner

Primary Examiner—David Mis
(74) Attorney, Agent, or Firm—Laurence A. Greenberg; Werner H. Stemer; Ralph E. Locher

(57) ABSTRACT

To keep the power consumption in the modulator-demodulator of a mobile radio as low as possible, the modulator-demodulator has a voltage-controlled oscillator. Downstream of which a divider chain having a plurality of series-connected dividers each with an even-numbered division factor is connected. Each of the dividers produces a carrier signal and a carrier signal that is orthogonal with respect thereto. A quadrature modulator for the received signal is connected to a divider of the divider chain that produces the carrier signal at the required carrier frequency. In addition, a first vector modulator is provided whose mixers are connected to the dividers of the divider chain that produce the carrier signals at the required carrier frequencies. Connected downstream of the first vector modulator is a further divider with an even-numbered division factor, and connected downstream of this is a second vector modulator for producing a transmitted signal.

8 Claims, 1 Drawing Sheet

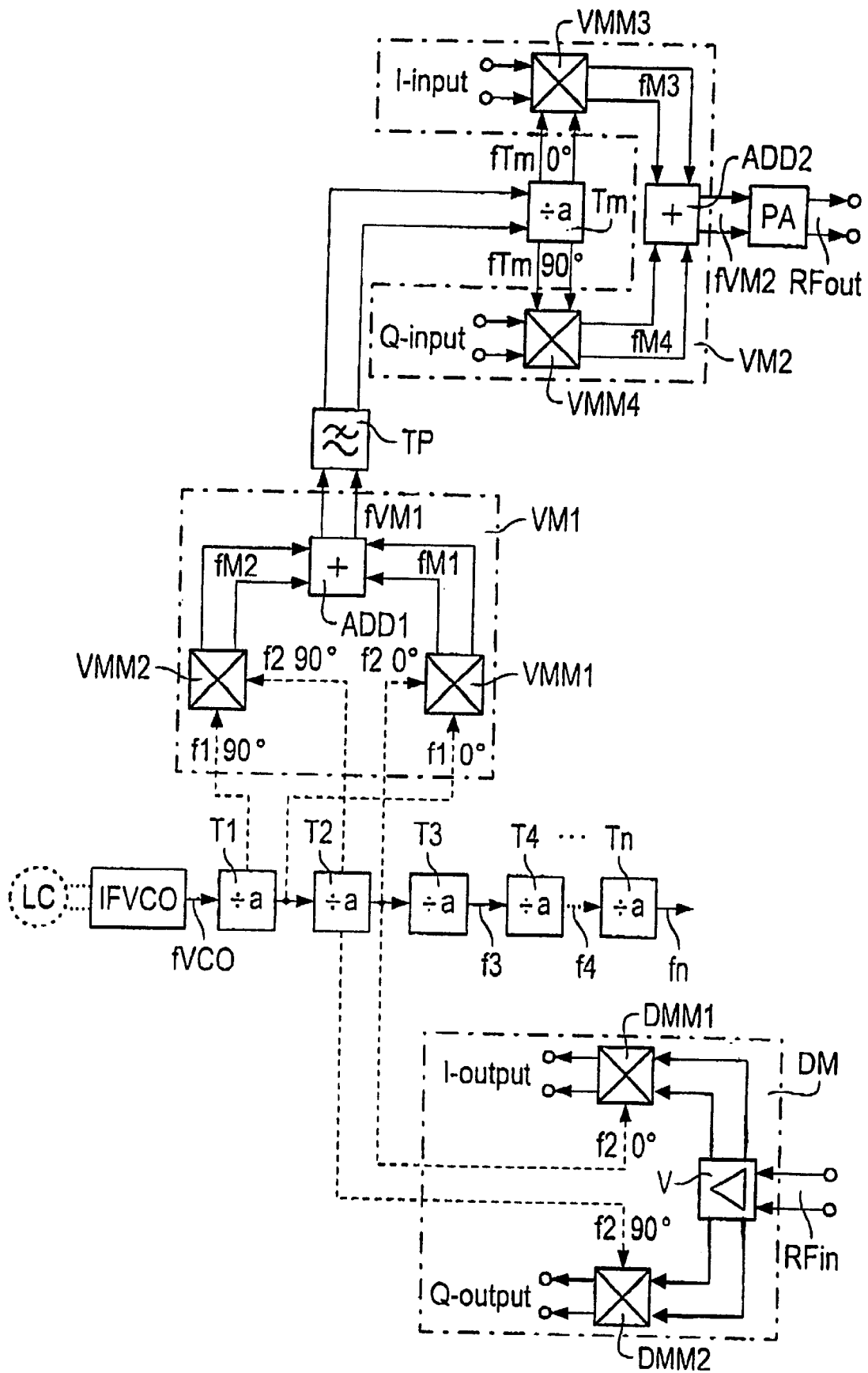

MODULATOR-DEMODULATOR

CROSS-REFERENCE TO RELATED APPLICATION

This application is a continuation of copending International Application No. PCT/DE00/02790, filed Aug. 17, 2000, which designated the United States.

BACKGROUND OR THE INVENTION

FIELD OF THE INVENTION

The invention relates to a modulator-demodulator.

Modulator-demodulators are used, by way of example, in the transmission-reception paths of mobile radios. During modulation and demodulation, messages are conditioned into a signal form that ensures that the message is transmitted over the greatest possible distance while maintaining the required signal-to-noise ratio.

During modulation and demodulation based on code multiplexing such as code division multiple access (CMDA), also called spread spectrum multiplexing (SSMA), the reception path is always in operation, whereas the transmission path operates only intermittently. A level of power consumption during operation determines the maximum possible standby time. If the intention is to use only a single voltage controlled oscillator for the modulator and the demodulator, then the different frequencies required for the modulator and the demodulator results in that frequency dividers are necessary. In the case of wideband CDMA (WCDMA), a divider with a division factor of two is used to obtain, by way of example, the transmitted signal having a transmitted signal frequency of 570 MHz from the oscillator signal of a voltage-controlled oscillator with an oscillator frequency of 1140 MHz. In the A reception path, a signal with a carrier frequency of 380 KHz is required, therefore a divider with a division factor of 3 is needed when using the 1140 MHz oscillator. However, a drawback is that a divider with an uneven division factor has a higher power consumption than a divider with an even By division factor. In addition, dividers with an uneven division factor have a more asymmetrical duty cycle than dividers with an even division factor.

Published, European Patent Application EP 0 905 917 A2 specifies a modulator-demodulator, configured for GSM 900/DCS 1800 Standard, in which the carrier frequencies required for frequency mixer, modulator and demodulator are produced using a plurality of oscillators and frequency dividers. The modulator-demodulator is able to transmit and receive in different frequency bands (dual band). With GSM, transmission and reception take place in timeslots and not at the same time.

SUMMARY OF THE INVENTION

It is accordingly an object of the invention to provide a modulator-demodulator that overcomes the above-mentioned disadvantages of the prior art devices of this general type, whose power consumption is as low as possible in order to achieve the greatest standby time possible.

With the foregoing and other objects in view there is provided, in accordance with the invention, a modulator-demodulator. The modulator-demodulator contains a voltage controlled oscillator and a divider chain connected downstream of the voltage controlled oscillator. The divider chain has a plurality of series-connected dividers each with a respective even-numbered division factor. Each of the dividers produces carrier signals including a first carrier signal and a second carrier signal orthogonal with respect to the first carrier signal. A quadrature demodulator for receiving an input signal is connected to one of the dividers of the divider chain producing the carrier signals at a desired carrier frequency. A first vector modulator having mixers is connected to the dividers of the divider chain producing the carrier signals at required carrier frequencies. A further divider with an even-numbered division factor is connected downstream of the first vector modulator. A second vector modulator is provided for producing a transmitted signal. The second vector modulator is connected downstream of the further divider.

In the inventive modulator-demodulator, the voltage-controlled oscillator is provided, downstream of which the divider chain is connected. The divider chain has a plurality of series-connected dividers with a respective even-numbered division factor. Each divider produces a carrier signal and a carrier signal that is orthogonal with respect thereto. In addition, the quadrature demodulator for a received signal is provided which is connected to the divider of the divider chain that produces the carrier signal at the required carrier frequency. The first vector modulator has the mixers that are connected to the dividers of the divider chain that produce the carrier signals at the required carrier frequencies. In addition, a further divider with an even-numbered division factor is provided which is connected downstream of the first vector modulator. Connected downstream of the further divider is the second vector modulator for producing a transmitted signal.

The modulator-demodulator advantageously has a low-pass filter that is connected between the first vector modulator and the further divider. The low-pass filter can filter out disturbing signal components.

In accordance with another embodiment of the inventive modulator-demodulator, the division factors of the dividers is 2.

In accordance with another feature of the invention, the modulator-demodulator can advantageously be used in a mobile radio system.

The modulator-demodulator has a second divider connected to the demodulator and in which the first divider and the second divider are connected to the first vector modulator. This configuration is advantageously suitable for the UMTS frequency plan, specifically at an oscillator frequency fVCO=1520 MHz or fVCO=760 MHz, in particular.

The modulator-demodulator has a third divider that is connected to the demodulator and in which the second divider and the third divider are connected to the first vector modulator. This configuration is likewise advantageously suitable for the UMTS frequency plan, specifically at an oscillator frequency fVCO=1520 MHz, in particular.

The modulator-demodulator in accordance has the second divider connected to the demodulator and the second divider and the third divider are connected to the first vector modulator.

The configuration is likewise advantageously suitable for the UMTS frequency plan, specifically at an oscillator frequency fVCO=1520 MHz, in particular.

The modulator-demodulator has the first divider connected to the demodulator and in which the first divider and the second divider are connected to the first vector modulator. This configuration is likewise advantageously suitable for the UMTS frequency plan, specifically at an oscillator frequency fVCO=760 MHz, in particular.

Other features which are considered as characteristic for the invention are set forth in the appended claims.

Although the invention is illustrated and described herein as embodied in a modulator-demodulator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block diagram of a modulator-demodulator according to the invention.

DESCRIPTION OF THE PREFERRED EMBODIMENT

Referring now to the single FIGURE of the drawing in detail, there is shown an inventive modulator-demodulator that has a voltage-controlled oscillator IFVCO whose oscillator frequency fVCO can be set using an LC element LC.

Connected downstream of the voltage controlled oscillator IFVCO is a divider chain having n dividers T1, T2, T3, T4, ... Tn. The divider T1 divides the output signal from the voltage controlled oscillator IFVCO by a division factor a. In this context, the divider T1 produces an output signal having the frequency f1=FVCO:a and phase shift $\phi=0°$ and an output signal having the frequency f1=FVCO:a and a phase shift $\phi=90°$. The divider T2, which is connected downstream of the divider T1, divides the latter's output signal having the frequency f1 likewise by the division factor a and makes this output signal, divided by the division factor a having the frequency f2=f1:a with a phase shift $\phi=0°$ and a phase shift $\phi=90°$, available at its outputs. The dividers T3 to Tn are of corresponding configuration and each divide the output signal from the previous divider by the division factor a. Thus, the outputs of the divider Tn produce a signal having the frequency fn=$0.5^n$*fVCO, if the division factor is a=2. Generally, the divider Tn produces the output signal having the frequency fn=$(1/a)^n$*fVCO at its outputs. The division factor a is an even-numbered value, for example 2, 4, 8, etc.

A demodulator DM is used for demodulating a received signal RF1n. To this end, the demodulator DM has an amplifier V, to whose input the received signal RFin is applied. The received signal RFin amplified by the amplifier V is supplied to a first mixer DMM1 in the demodulator DM and to a second mixer DMM2 in the demodulator DM. The two mixers DMM1 and DMM2 are connected to the outputs of the second divider T2 in the divider chain in the figure by way of example, so that the signal from the second divider T2, phase shifted through 0° and having the frequency f2, is supplied to the first mixer DMM1, and the output signal from the second divider T2, having the frequency f2 and the 90° phase shift, is supplied to the second mixer DMM2 in the demodulator DM. At the output of the first mixer DMM1, the demodulated imaginary part of the received signal I-output can be tapped off. At the output of the second mixer DMM2, the demodulated real part of the received signal Q-output can be tapped off. In line with the required carrier frequency at the inputs of the two mixers DMM1 and DMM2, the two mixers inputs are connected to the outputs of the respective dividers T1, T2 ... Tn. If, by way of example, the oscillator fVCO produces a signal using an oscillator frequency fVCO=1520 MHz, and if the demodulator DM requires an intermediate frequency of 380 MHz, then the inputs of the two mixers DMM1 and DMM2 need to be connected to the outputs of the second divider T2 so that the reception path has a total division factor nRX=4, if the division factor a assumes the value 2.

The inventive modulator-demodulator additionally has a first vector modulator VM1 containing two mixers VMM1 and VMM2. According to the carrier frequency required, the inputs of the two mixers VMM1 and VMM2 are connected to the appropriate outputs of the dividers T1, T2, T3, T4 ... Tn in the divider chain. In the present exemplary embodiment shown in the FIGURE, the first input of the first mixer VMM1 is connected to the output of the divider T1 producing a signal having frequency f1 and the phase shift $\phi=0°$. The second input of the first mixer VMM1 is connected to the output of the second divider T2, which produces a signal having the frequency f2 and the phase shift $\phi=0°$. A first input of the second mixer VMM2 is connected to the output of the divider T1, which produces a signal having the frequency f1 and the phase shift $\phi=90°$. The second input of the second mixer VMM2 is connected to the output of the divider T2, which produces a signal having the frequency f2 and a phase shift $\phi=90°$. The first mixer VMM1 thus mixes the two signals having the phase shift $\phi=0°$ and the frequencies f1 and f2, so that the output of the first mixer VMM1 produces a signal having the frequency fM1=f1±f2 and $\phi=0°$. The second mixer VMM2 mixes the signals having the phase shift $\phi=90°$ and the frequency f1 and f2, so that the output of the second mixer VMM2 produces a signal having the frequency fM2=f1±f2 and $\phi=90°$. The adder ADD 1 forms a sum of the two signals having the frequencies fM2 and fM1 and delivers at its output a signal having the frequency fVM1, which primarily contains a signal having the frequency fVM1=f1+f2. Adding the two signals phase shifted through 90° attenuates the signal component with the frequency f1−f2 by approximately 40 dB.

A low-pass filter TP is used to filter out the undesirable signal components, for example the residual signal components having the mixed frequency f1−f2. The signal filtered in this way is routed to a further divider Tm, which likewise has a division factor a. The signal having a frequency fVM1:a is supplied to a mixer VMM3 and to a mixer VMM4 in a second vector modulator VM2, once phase shifted through 0° and once phase shifted through 90°. The mixer VMM3 in the vector modulator VM2 mixes the signal phase shifted through 0°, having the frequency fVM1:a, with the imaginary part of the as yet unmodulated transmitted signal I-input to form a signal having the frequency fM3. The signal is supplied to an adder ADD2. The signal phase shifted through 90°, having the frequency fVM1:a, is mixed by the mixer VMM4 with the real part of the as yet unmodulated transmitted signal Q-input to form a signal having the frequency fM4, and is likewise supplied to the adder ADD2. At the output of the adder ADD2, a signal having the frequency fVM2=fM3+fM4 can be tapped off. The signal is is amplified using a transmitted signal amplifier PA and can then be tapped off as a transmitted signal RFout at the output of the transmitted signal amplifier PA.

Depending on the frequency plan, the outputs of the mixers DMM1, DMM2, VMM1 and VMM2 can be connected to the appropriate outputs of the dividers T1, T2, T3, T4 ... Tn. The frequency plan for universal mobile telecommunications system (UMTS) is shown in table form below. The first column of the table indicates the oscillator frequency fVCO of the signal made available by the voltage-controlled oscillator IFVCO. The second, third and fourth columns respectively indicate the frequencies f1, f2, f3 of the signals produced at the outputs of the corresponding dividers T1, T2 and T3. Column 5 indicates the total division factor nRX required for the demodulator DM, and column 6 indicates the carrier frequency fRx that is thus available for the two demodulators DM1 and DM2, with the carrier frequency RX assuming the value of the frequency f1, f2 or f3 on the basis of the total division factor nRX. Column 7 indicates the respective formula for the output signal from the first vector modulator VM1 with the frequency fVM1. Column 8 indicates the numerical value for the frequency fVM1, and column 9 indicates the value for the frequency fTm. Finally, column 10 indicates the ratio of the transmission frequency fTm to the reception carrier frequency fRx.

| fVCO MHz | f1 MHz | f2 MH2 | f3 MHz | NRX | fRx MHz | fVM1 | fVM1 MHz | fTm MHz | fTm/fRx |
|---|---|---|---|---|---|---|---|---|---|
| 1520 | 760 | 380 | 190 | 4 | 380 | FVCO/2 + fVCO/4 | 1140 | 570 | 1.5 = 3/2 |
| 1520 | 760 | 380 | 190 | 8 | 190 | FVCO/4 + fVCO/8 | 570 | 285 | 1.5 = 3/2 |
| 1520 | 760 | 380 | 190 | 4 | 380 | FVCO/4 + fVCO/8 | 570 | 285 | 0.75 = 3/4 |
| 760 | 380 | 190 | 95 | 2 | 380 | FVCO/2 + fVCO/4 | 570 | 285 | 0.75 = 3/4 |
| 760 | 380 | 190 | 95 | 4 | 190 | FVCO/2 + fVCO/4 | 570 | 285 | 1.5 = 3/2 |

The effect achieved by the invention in this context is that, even when using dividers that merely have even-numbered division factors, it is possible to achieve division ratios for which the division ratio fraction fTm/fRx in the counter includes an uneven number. The invention thus provides a simple way of implementing a modulator-demodulator with a frequency plan based on UMTS that dispenses with dividers having uneven division factors.

The signal produced by the voltage-controlled oscillator IFVCO can be produced within the chip that also contains the other components shown in the figure. The undesirable signal component at the output of the first vector modulator VM1 is attenuated by approximately 40 dB.

The invention results in the transmission path being controlled with a good duty cycle, and there is sufficient phase accuracy in the modulation.

We claim:

1. A modulator-demodulator, comprising:
   a voltage controlled oscillator;
   a divider chain connected downstream of said voltage controlled oscillator and having a plurality of series-connected dividers each with a respective even-numbered division factor, and each of said dividers produces carrier signals including a first carrier signal and a second carrier signal orthogonal with respect to the first carrier signal;
   a quadrature demodulator for receiving an input signal and connected to one of said dividers of said divider chain producing the carrier signals at a desired carrier frequency;
   a first vector modulator having mixers connected to said dividers of said divider chain producing the carrier signals at required carrier frequencies;
   a further divider with an even-numbered division factor connected downstream of said first vector modulator; and
   a second vector modulator for producing a transmitted signal, said second vector modulator connected downstream of said further divider.

2. The modulator-demodulator according to claim 1, including a low-pass filter connected between said first vector modulator and said further divider.

3. The modulator-demodulator according to claim 1, wherein the division factor for each of said dividers and said further divider is two.

4. The modulator-demodulator according to claim 3, wherein said divider chain includes a first divider and a second divider, said second divider connected to said demodulator, and said first divider and said second divider are connected to said first vector modulator.

5. The modulator-demodulator according to claim 3, wherein said divider chain includes a first divider, a second divider, and a third divider, said third divider is connected to said demodulator, and said second divider and said third divider are connected to said first vector modulator.

6. The modulator-demodulator according to claim 3, wherein said divider chain includes a first divider, a second divider, and a third divider, said second divider is connected to said demodulator, and said second divider and said third divider are connected to said first vector modulator.

7. The modulator-demodulator according to claim 3, wherein said divider chain includes a first divider and a second divider, said first divider is connected to said demodulator, and said first divider and said second divider are connected to said first vector modulator.

8. A method of operating a mobile radio system, which comprises the steps of:
   providing a modulator-demodulator containing a voltage controlled oscillator, and a divider chain connected downstream of the voltage controlled oscillator and having a plurality of series-connected dividers each with a respective even-numbered division factor, each of the dividers produces carrier signals including a first carrier signal and a second carrier signal orthogonal with respect to the first carrier signal, the modulator-demodulator further containing a quadrature demodulator for receiving an input signal and connected to one of the dividers of the divider chain producing the carrier signals at a desired carrier frequency, a first vector modulator having mixers connected to the dividers of the divider chain producing the carrier signals at required carrier frequencies, a further divider with an even-numbered division factor connected downstream of the first vector modulator, and a second vector modulator for producing a transmitted signal connected downstream of the further divider; and
   using the modulator-demodulator in the mobile radio system.

* * * * *